(12) United States Patent
Mottram et al.

(10) Patent No.: US 9,280,018 B2
(45) Date of Patent: Mar. 8, 2016

(54) MULTISTABLE REFLECTIVE LIQUID CRYSTAL DEVICE

(75) Inventors: Nigel Mottram, Glasgow (GB); Andrew Davidson, Glasgow (GB)

(73) Assignee: Sybre Limited, Stratford Upon Avon, Warwickshire (GB)

(*) Notice: Subject to any disclaimer, the term of this patent is extended or adjusted under 35 U.S.C. 154(b) by 908 days.

(21) Appl. No.: 12/308,142

(22) PCT Filed: Jun. 7, 2007

(86) PCT No.: PCT/GB2007/002084
§ 371 (c)(1),
(2), (4) Date: Sep. 28, 2009

(87) PCT Pub. No.: WO2007/141525
PCT Pub. Date: Dec. 13, 2007

(65) Prior Publication Data
US 2010/0014011 A1   Jan. 21, 2010

(30) Foreign Application Priority Data

Jun. 7, 2006 (GB) .................................. 0611141.3

(51) Int. Cl.
| | | |
|---|---|---|
| *G02F 1/1337* | (2006.01) | |
| *G02F 1/1343* | (2006.01) | |
| *G02F 1/139* | (2006.01) | |
| *G02F 1/1335* | (2006.01) | |
| *G02F 1/1333* | (2006.01) | |

(52) U.S. Cl.
CPC ............ *G02F 1/1337* (2013.01); *G02F 1/1391* (2013.01); *G02F 1/133377* (2013.01); *G02F 1/133553* (2013.01); *G02F 1/133707* (2013.01); *G02F 1/133753* (2013.01); *G02F 1/134363* (2013.01)

(58) Field of Classification Search
CPC ................... G02F 1/133377; G02F 1/134363; G02F 1/133753; G02F 1/133553; G02F 1/1391; G02F 1/1337; G02F 1/133707
See application file for complete search history.

(56) References Cited

U.S. PATENT DOCUMENTS 4,295,712 A * 10/1981 Ishiwatari .................... 349/156
4,333,708 A *  6/1982 Boyd et al. .................... 349/129
5,751,382 A *  5/1998 Yamada et al. ................ 349/12
(Continued)

FOREIGN PATENT DOCUMENTS

EP  0 517 715  12/1992
EP  1 271 225   1/2003
(Continued)

OTHER PUBLICATIONS

Thurston, R.N. et al., "*Mechanically Bistable Liquid-Crystal Display Structures*," IEEE Transactions on Electron Devices, vol. ED-27, No. 11, 1980, pp. 2069-2080.

(Continued)

*Primary Examiner* — Jessica M Merlin
(74) *Attorney, Agent, or Firm* — Donald E. Stout; Stout, Uxa & Buyan, LLP (57) ABSTRACT

A multistable liquid crystal device having liquid crystal molecules in one or more cavities, wherein at least one liquid crystal region of high distortion (100, 110) is formed in each cavity, the distortion region (100, 110) being switchable between at least two stable states on application of an electric field, the device being such that at least one of the stable states may be utilized as a reflective mode.

18 Claims, 4 Drawing Sheets

(56) References Cited

U.S. PATENT DOCUMENTS

| | | | |
|---|---|---|---|
| 5,796,459 A | | 8/1998 | Bryan-Brown et al. |
| 5,978,062 A | * | 11/1999 | Liang et al. ............ 349/155 |
| 6,016,180 A | * | 1/2000 | Bradshaw et al. ........ 349/156 |
| 6,469,768 B1 | | 10/2002 | Lee |
| 7,471,362 B1 | * | 12/2008 | Jones ...................... 349/129 |
| 2008/0106662 A1 | * | 5/2008 | Mottram et al. ........... 349/42 |

FOREIGN PATENT DOCUMENTS

| | | |
|---|---|---|
| EP | 1 271 226 A1 | 1/2003 |
| EP | 1 139 151 | 5/2007 |
| WO | WO 92/00546 | 1/1992 |
| WO | WO 97/14990 | 4/1997 |
| WO | WO 2006/059128 A | 6/2006 |

OTHER PUBLICATIONS

Repnik, R. et al., "*Physics of defects in nematic liquid crystals*," European Journal of Physics, vol. 24 (2003), pp. 481-492.

International Search Report for PCT/GB2007/002084, dated Sep. 7, 2007.

\* cited by examiner

MULTISTABLE REFLECTIVE LIQUID CRYSTAL DEVICE

The present invention relates to a multistable reflective liquid crystal device and a liquid crystal display that includes such a device.

BACKGROUND

Liquid crystal materials (LCs) consist of rod-like molecules that prefer to align parallel to each other and are capable of being aligned by applied electric fields. The long-range order caused by the local alignment of molecules enables the "director", the average molecular direction, to be defined. The long and short axes of these molecules exhibit different optical properties and certain molecular orientations can therefore alter the polarisation and intensity of incident light. These reorientation and polarisation effects can be utilised in conjunction with optical elements such as polarising and reflective layers to produce optical devices such as optical switches, changeable phase gratings or displays.

Existing LC devices commonly have two transparent substrates, with semi-transparent electrodes that may be patterned into pixels on the inner side of each substrate, sandwiching a liquid crystal (LC) material between them. A reflective coating may be placed at one substrate if the device is to be used to reflect incident light once it has passed through the liquid crystal layer rather than in a transmissive mode. Optical polarisers are usually placed on the outer surface of one or both substrates. Between the liquid crystal layer and each electrode/substrate an alignment layer is used to specify the orientation of the LC molecules close to the substrate. Each pixel may be addressed "passively" using a voltage applied across the pixel row and column electrodes or "actively" using thin film transistors to selectively apply an electric field across a single pixel. This electric field may be used to switch the liquid crystal molecules between two orientational states, each with a different effect on the light passing through the LC layer such that, depending on the state, the light may either be transmitted through or blocked by the polariser(s).

One method of achieving this is through the use of twisted nematic configurations. In these devices, alignment layers are used to orient the LC molecules close to opposing substrates in perpendicular directions to each other. In the state where no electric field is applied across a pixel, the perpendicular LC alignment close to the substrates results in a 90° twist in LC orientation as one moves from surface to surface. This has the effect of rotating the polarisation of the light through 90°. When polarisers are placed parallel to the alignment directions at each substrate, incident light becomes initially polarised by the first polariser in one direction, then the polarisation direction of the light is rotated 90° by the LC to coincide with the second polariser at the other substrate, such that light is output from the pixel. Coloured filters may be placed over the pixel to produce coloured pixels. When a voltage is applied between the electrodes of a pixel, the LC aligns with the direction of the field, i.e. perpendicular to the plane of both substrates. In this state, as the LC molecules are aligned parallel to the direction of the propagation of the light, no change in polarisation of the light due to the LC configuration takes place. Thus, polarised light from the first polariser is blocked by the second polariser in the perpendicular direction. This type of device is "transmissive" since the incident light passes through the device from a light source (i.e. a backlight in a display module) on one side to the observer on the other.

An alternative method of displaying information using a liquid crystal device is through the use of a "reflective" LC device. A typical reflective device is constructed in a similar way to a transmissive device except the polariser furthest away from the observer is replaced by a reflective element. Light is incident from the same side of the device as the observer and is initially polarised by the polariser in one direction. One of the possible LC configurations is such that the polarisation direction of the light is rotated by 45° by the LC, before it is reflected by the reflective element and then rotated again by 45° by the LC. The total rotation of the polarisation of light by 90° means that the light is blocked by the polariser. When a voltage is applied between the electrodes of a pixel, a reorientation of the LC occurs such that the LC configuration does not affect the polarisation of light and the incident light is polarised, transmitted through the LC, reflected and transmitted through the LC again with no change in polarisation direction, so that the polariser allows the light to be emitted and observed. Coloured filters may be placed over the pixel to produce coloured pixels.

LC displays have many advantages such as being very flat, light and robust when compared with other display types such as cathode ray tubes. As such they are ideal for small portable devices such as mobile phones and PDAs. However, they have a high-energy demand due to the need for constant power to be applied to hold a pixel in one state. Furthermore, transmissive displays typically require backlighting from a light source to achieve a bright picture with high contrast, which in turn further increases the power consumption, leading to a shortened battery life. In addition, since these systems employ out of plane switching, where the LC molecules align themselves perpendicularly to the plane of the substrates in the presence of the electric field, birefringence effects can lead to a loss of contrast when viewed from the side. The resultant geometry may also lead to colour distortion due to parallax effects.

Some of the problems associated with the devices described above are addressed by multistable or, specifically, reflective bistable liquid crystal technology. In a multistable liquid crystal device, the LC has more than one stable director configuration. As such, once switched into a stable state, the LC remains in that state until an electric field is applied to change the configuration. This type of operation requires less power since power is only supplied to change states and not supplied continuously to maintain a state. The reflective aspect of such a technology removes the need for a backlight, further reducing the power consumption.

In Thurston et al. IEEE Transactions on Electronic Devices Ed-27, no. 11, pp. 2069-2080 1980, LC devices having a number of possible multistable systems are described. In particular, zenithal multistable devices are described which produce distortion out of the substrate plane. In-plane multistable devices are also described that rely on patterned alignment regions on the substrates.

U.S. Pat. No. 4,333,708 describes an example of a bistable LC device having a number of multistable modes that involve the motion of singular points or "disclinations" lying parallel to the device substrates. EP 0,517,715 and WO92/00546 describe other examples of bistable LC devices, in which surface treatments (evaporation of SiO) are used to produce a bistable surface alignment layer. This surface exhibits two possible director configurations. By switching the director at the surface with the application of a suitable voltage waveform, switching between the two states is possible.

Another possible bistable device is described in U.S. Pat. No. 5,796,459. This has substrate surfaces that have been treated so that bigratings exist on one or both substrates. This bigrating arrangement creates two different possible angular directions in which the LC molecules can lie. WO 97/14990 describes a further example of a bistable device. This has a surface alignment monograting on at least one of the substrates. The surface monograting has a groove height to width ratio that leads to approximately equal energy for two director alignment arrangements. The director alignment arrangements differ from each other primarily by angle of the director from the plane of the substrate. The device is switched using appropriate voltage pulses.

Yet another approach to producing bistable liquid crystal devices involves having an array of either posts or holes placed on one of the substrates. Devices of this type are described in EP 1,271,225 and EP 1,139,151. The presence of posts or holes allows multiple director orientations to be stable. The difference between the director orientations is primarily in the difference in director angle from the main plane of the substrates. Switching between these states is achieved using appropriate voltage pulses coupling to the molecular dipoles.

In all of the above devices, each stable state has a different effect on the polarisation of light and this can be used in conjunction with suitably oriented polarisers to allow or block the transmittance of light. These systems may be used with light transmitted through the device or reflected from a surface at the back of the device. Variations in surface treatments on the sub-pixel level may be used to achieve greyscale. Whilst these provide some advantages over more conventional arrangements, they suffer from the fact that the switching is out of plane, which can lead to loss of contrast at oblique viewing angles and colour deformations due to parallax errors.

Some of the devices described above may contain LC defect regions. When LCs are enclosed within a container, the molecular direction is influenced by the container surfaces. This can lead to conflicts at certain regions, resulting in defects. In these defect regions, the molecules align themselves in such a fashion so that a high distortion energy structure, associated with a reduction in molecular order, is formed, as discussed by Repnik et al. in European Journal of Physics, Vol. 24, pages 481-492 (2003). Depending on factors such as the dimensions and shape of the container, topography of the surface, temperature, applied electric field and the surface energy of the walls, several configurations of the liquid crystal molecules may be possible. Each configuration may have varying defect positions and alignment of bulk liquid crystal molecules. Defects are, however, generally regarded as undesirable as they lower device efficiency. Hence, in most known devices steps are taken to remove such defects or avoid their formation altogether.

SUMMARY OF INVENTION

According to a first aspect of the present invention, there is provided a reflective multistable liquid crystal device having a liquid crystal material contained within discrete cavities in a containment structure, the cavities being such that at least one region of high distortion or defect in the ordering of the liquid crystal molecules is formed, the distortion region(s) being switchable between at least two stable states on application of an electric field, the device being such that it is reflective in at least one of the states.

In contrast to some prior art arrangements, rather than trying to remove defects, the present invention takes advantage of these and uses them to provide multistable states. Indeed, the walls of the containment structures are used to induce the formation of defect structures. By applying an appropriate electric field, the distortion region(s) can be switched between these states. This can be done substantially in-plane, thereby avoiding or at least reducing the loss of contrast at oblique viewing.

The confined containment structure of the present invention affords advantages over unconfined systems, such as those described in Thurston et al. IEEE Transactions on Electronic Devices Ed-27, no. 11, pp. 2069-2080 1980, in that the open region between the switchable regions of the Thurston device will detrimentally affect the contrast and reflectance characteristics in the unconfined devices whereas in the present invention the containment structure is homogeneous and has a calculable fixed optical effect which may be minimised.

Means may be provided for applying the electric field as a pulse. Means may be provided for varying the magnitude and duration of that pulse.

The liquid crystal molecules and the containment structure are preferably between two transparent substrates that may be flexible or rigid, glass or plastic. For flexible substrates isolating the liquid crystal in one cavity from surrounding cavities is particularly advantageous, since this minimises flow effects and liquid crystal layer thickness variations that disrupt switching and optical quality. The transparent substrates may have semi-transparent or transparent electrodes on either surface.

An electrode may be associated with one or more cavities. Electrodes may additionally or alternatively be located on the cavity walls. These electrodes may be such that each electrode may be attached to a switching device. The switching device may contain one or more thin film transistors.

The device may have a reflective backplate. The transparent substrates may be laminated with a polariser layer. The polariser layer polarises incident light. The polarised light passes through the liquid crystal, which may or may not change the polarisation of the light depending on the alignment of the liquid crystal molecules. The light is reflected from the reflective backplate and selectively transmitted or blocked by the polariser depending on the change in polarisation of the light caused by the liquid crystal.

Each cavity may be arranged such that the direction of the majority of liquid crystal molecules in at least one stable state is substantially 45° to the direction of the majority of liquid crystal molecules in at least one other stable state. In at least one state, the liquid crystal orientation may be largely parallel to the direction of the polariser that is nearest to the viewer, with the orientation in the other state being substantially at an angle of 45 degrees to the polariser direction. With the appropriate thickness of liquid crystal, typically between 1 and 50 µm, these two liquid crystal configuration states will allow incident light to be reflected from the device or not allow light to be reflected, respectively. In contrast, liquid crystal devices having 90° switching between stable states are unsuitable for use with a reflective backplate, as the 90° switch coupled with the reflection realigns the direction of light with the polariser and prevents the blocking of reflected light.

The containment structure may have cavities that have a hexagonal or other polygon cross-section in which the bulk liquid crystal molecules in each stable state lie at an oblique angle to the alignment of liquid crystal molecules in another stable state, in a plane parallel to the transparent substrates. The angles of the cross-section need not be sharply defined.

The cavity walls preferably run substantially perpendicular to a base or substrate of the containment structure. The containment structure may be formed from polymer or photoresist using photolithography.

The cavities in the containment structure may be open ended and flush or integral with the transparent substrates or any of the above laminated layers such that the liquid crystal in each cavity is isolated from the liquid crystal in adjoining cavities.

The majority of liquid crystal molecules may lie in a plane substantially parallel with the planes of the transparent substrates. In one embodiment, stable states of equal energy are formed such that any stable state may be obtained from any other stable state by rotation about an axis perpendicular to the substrates.

At least two of the cavities may be linked by at least one communication channel. The communication channels may be less than 20 μm wide and preferably less than 5 μm wide.

According to another aspect of the invention, there is provided a method of switching states in a liquid crystal device containing liquid crystal molecules within a cavity in a containment structure, the cavity being such that at least one high distortion region is formed, the method comprising applying an electric field in order to switch from a first stable state to at least a second stable state by motion of defects, wherein the device is such that at least two of the stable states allow a different amount of light to be reflected from the device.

The cavity may be arranged so that the direction of the majority of liquid crystal molecules in at least first stable state is substantially 45° to the direction of the majority of liquid crystal molecules in at least one other stable state. The electric field may be parallel to the liquid crystal molecules or contain a component parallel to those molecules in order to effect in-plane switching. Preferably, switching is between states having similar or identical energies.

The device and method of the invention may be used for various applications including a display substrate, a phase device for telecommunications, an optical switch or a changeable phase grating.

BRIEF DESCRIPTION OF THE DRAWINGS

Various aspects of the invention will now be described by way of example only and with reference to the accompanying drawings of which.

SPECIFIC DESCRIPTION

Containing liquid crystals within containment structures having certain shapes and dimensions can lead to the tendency of the liquid crystal molecules to arrange themselves into one of a multiple of stable states, each stable state having differing director structures and possibly different locations of regions of high distortion. A high distortion location is a region where the liquid crystal molecular order is significantly reduced compared to the bulk and a large elastic distortion occurs, as discussed by Repnik et al. in European Journal of Physics, Vol. 24, pages 481-492 (2003).

Figure 1A:
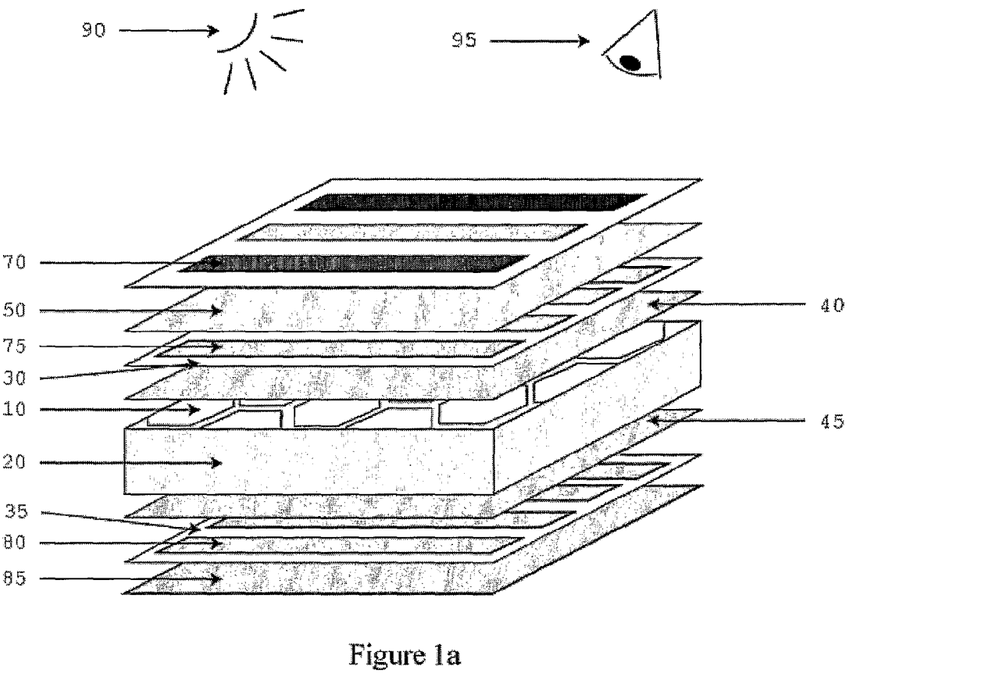
FIG. 1(a) is an expanded view of a liquid crystal device.
Figure 1B:
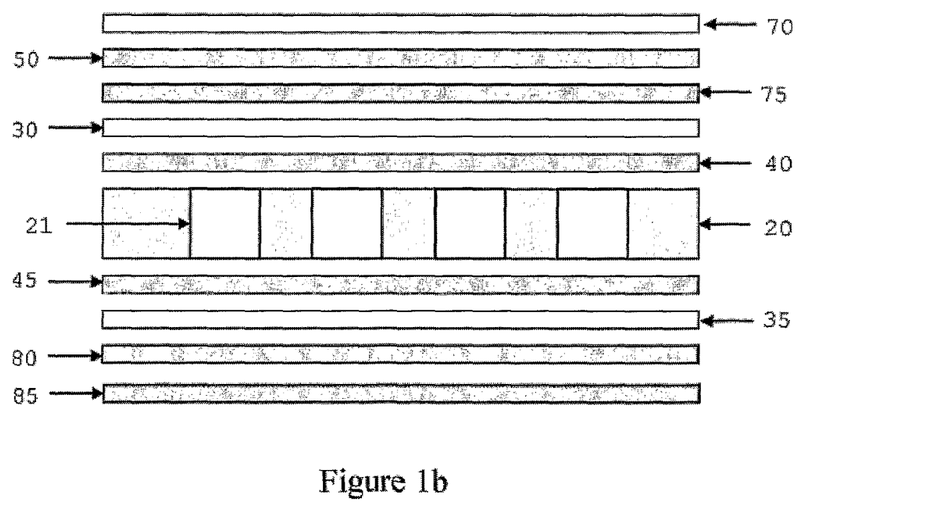
FIG. 1(b) is a cross section through the expanded view of FIG. 1(a)

FIGS. 1(a) and (b) shows a reflective liquid crystal device having a liquid crystal material 10 contained within a containment structure 20 that defines a plurality of openings 21. The containment structure 20 is sandwiched between two transparent substrates 30, 35, which may have alignment layer preparations 40, 45 adhered to faces in contact with the liquid crystal material 10. The containment structure 20 and the substrates 30, 35 together define a plurality of cavities for containing the liquid crystal material 10. The liquid crystal material 10 within each cavity completely fills it, so that the liquid crystal material is in direct contact with all of the cavity walls/surfaces, and adjacent cavities are completely isolated from each other.

A polariser 50 is laminated to the outside of one transparent substrate 30 and a colour filter 70 may be located over it. The colour filter 70 may be provided as a series of strips or squares of transparent coloured sections. Each cavity may have an area of colour filter 70 associated with it. Each colour filter may cover several cavities. The colour filter 70 may have red, green and blue transparent coloured sections. Laminated to the substrate 35 at the rear of the device is a reflective layer 85 that acts as a reflective back plate.

Figure 2:
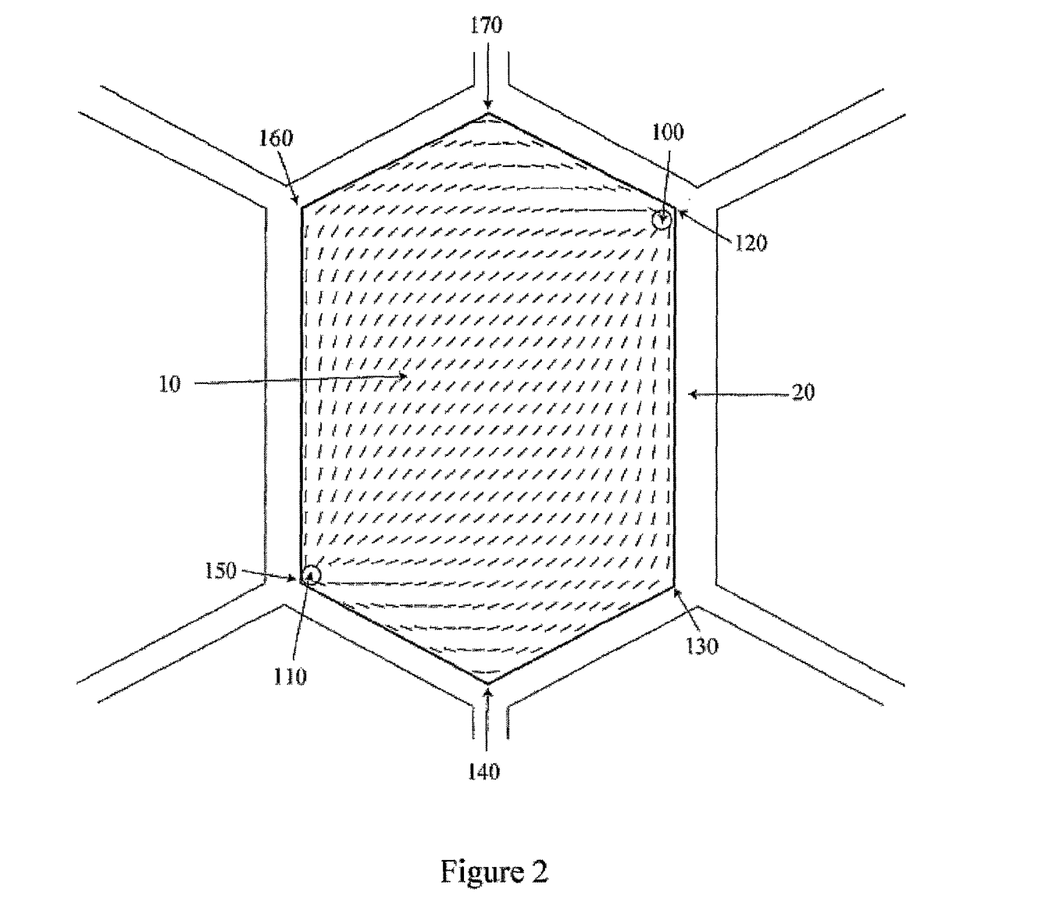
FIG. 2 is a representation of the alignment of liquid crystal molecules in a stable state in a cavity of the device of FIG. 1.
Figure 3:
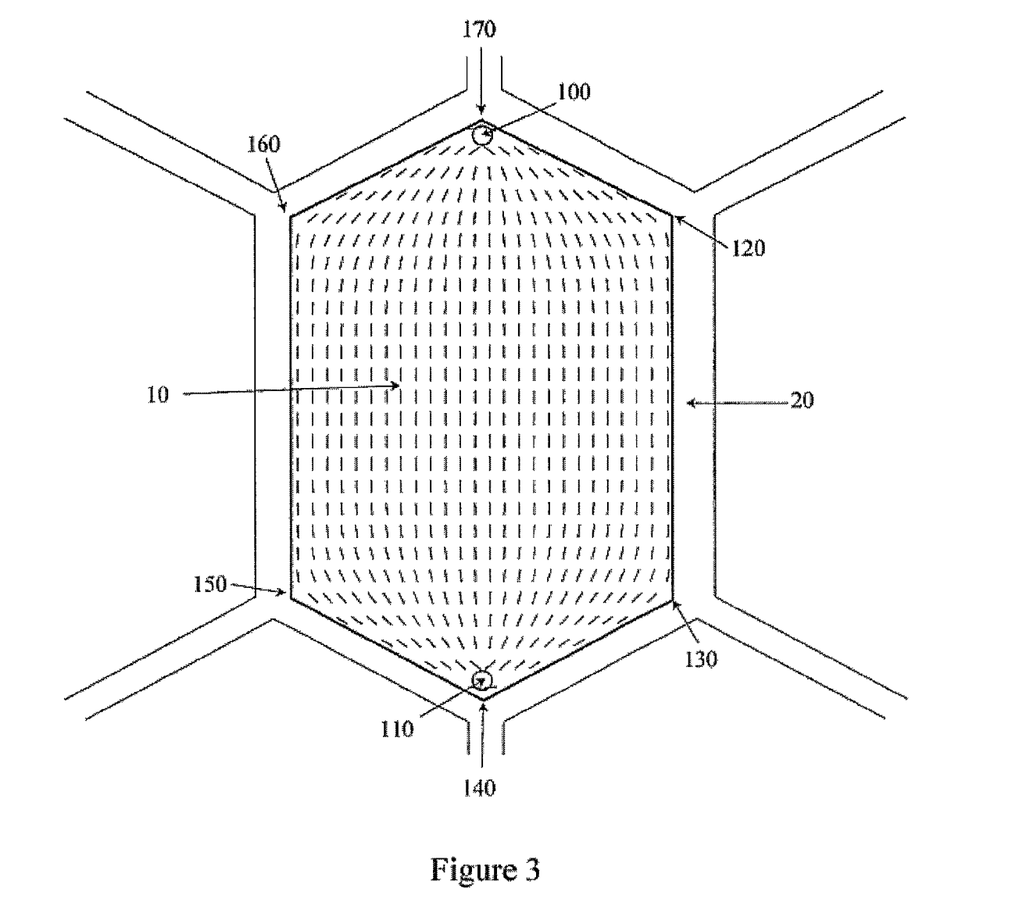
FIG. 3 is a representation of the alignment of liquid crystal molecules in a different stable state in a cavity of the device of FIG. 1.

As shown FIGS. 2 and 3, the cavities of the containment structure 20 have an approximately hexagonal cross section having sharp or rounded corners 120, 130, 140, 150, 160, 170 in a plane parallel to the transparent substrates 30, 35. In other embodiments, the cross section of the cavities may be any polygon with corners such that the alignment of the bulk liquid crystal is at an oblique angle to the alignment of liquid crystal in another stable state. The length of the sides of the hexagonal cross section of the cavity may be different and may be between 10 and 100 μm long and the cavity should be between 1 and 50 μm deep. The hexagonal cross section allows the possibility of two or more stable states.

On their surfaces and facing the liquid crystal 10, the transparent substrates 30, 35 have patterned transparent electrodes 75, 80 formed for example from a thin layer of conducting material such as Indium Tin Oxide. To achieve in-plane switching, these electrodes 75, 80 may be used to produce an electric field with a component in a plane parallel to that of the transparent substrates 30, 35. This may be achieved for example by having electrodes staggered so that the counter electrode is not directly below the working electrode. Alternatively or additionally, electrodes may be incorporated into the cavity walls in order to produce an electric field parallel to the substrate. Each electrode may be associated with one or more cavities and there may be more than one set of electrodes to enable switching between the two or more stable states.

The cavities in the containment structure 20 and associated electrodes 75, 80 may correspond to a pixel of a displayed image or several cavities and electrodes 75, 80 may correspond to one pixel in order to achieve a greyscale or full colour output.

The alignment of the liquid crystal molecules 10 on the containment structure 20 walls is dictated by a number of factors. For example, when the containment structure 20 is made of a polymeric material the polymer direction dictates the molecule direction. Alternatively, when a photoresist material such as SU8 is used to create the containment structure 20 the molecules prefer to lie in any direction parallel to the surface. As yet a further alternative, when a homeotropic alignment surface treatment is used the molecules prefer to lie perpendicular to the cavity surfaces with the molecules preferring parallel alignment at the transparent substrates 30, 35.

As shown in FIG. 2, for hexagonal cavities and for a planar alignment of the liquid crystal molecules 10 at the walls of the containment structure 20 and planar alignment at the transparent substrates 30, 35, the liquid crystal molecules 10 in the bulk of the region tend to align themselves at 45° to the sidewalls of the cavities and in a plane parallel to the transparent substrates 30, 35. To accommodate this preferred alignment of the liquid crystal molecules 10, high distortion regions 100, 110 form at two opposing corners of the cavity 120, 150. The relatively sharp transition between adjoining walls of the cavity is advantageous in promoting the formation of localised high distortion regions and pinning these regions to the corners 120, 150 of the cavity. The liquid crystal molecules 10 in the region of these high distortion sites 100, 110 are oriented differently to the majority of liquid crystal molecules 10 in the bulk. The further a LC molecule is from the high distortion site, the more its orientation is similar to those of the bulk, i.e. at 45° to the walls of the cavity.

As shown in FIG. 3, application of a suitable electric field having a component in the plane of the direction of the liquid crystal molecules 10 results in the high distortion regions 100, 110 moving, in this case switching between being located at corners 120 and 150 of the cavity to being located at corners 140 and 170 of the cavity. The bulk LC molecules 10 re-align themselves to match the change in location of the high distortion regions such that they lie at 45° to their previous direction but still lying in a plane parallel to that of the transparent substrates 30, 35. Thus the switching remains in-plane, i.e. the bulk liquid crystal molecules 10 always lie in a plane parallel to that of the substrates 30, 35. This has advantages in that it allows for a wide range of viewing angles due to the absence of birefringence effects and provides a high degree of contrast and reflectivity due to 45° switching between states.

Because the device of the present invention is reflective, in use the light source 90 is located on the same side as the observer 95. Light incident on the device is initially polarised by the polariser 50 in a first direction. One of the possible stable liquid crystal 10 configurations is such that the polarisation direction of the light is rotated by 45° by the liquid crystal before it is reflected by the reflective element 85 and then rotated again by 45° by the liquid crystal 10. The total rotation of the polarisation of light by 90° means that the light is blocked by the polariser 50. When a voltage is applied between the electrodes of a pixel, the bulk of the liquid crystal molecules can be switched by 45° into a second stable state, in which the liquid crystal molecules 10 are predominantly aligned with the direction of the polariser 50. Light 90 incident on this second stable state is polarised, transmitted through the liquid crystal, reflected by the reflective element 85 and transmitted through the liquid crystal again with no change in polarisation direction. In this case, the polariser 50 allows the light to be emitted and observed. In this way, the light is detected 95 or the picture viewed at the same side of the device as the light source 90.

The sharpness of the corners of the cavity determines both the stability of the different states, where the high distortion regions are located at different corners, and the voltage needed to switch the device between states. For sharper corners the elastic energy barrier between two different molecular configurations is high compared to smoother corners. The increase in the energy barrier both increases the stability of the two states and increases the voltage needed to switch between the two states.

The device in which the invention is embodied provides numerous advantages. The confinement of the liquid crystal into cavities means that the device is less susceptible than conventional arrangements to damage due to knocks and vibrations. In addition, altering the exact polygonal shape of the cavity allows the use of two stable uniform states that have identical energies. This allows easier switching between the two states.

Using the invention, it is possible to achieve a rugged device having a good contrast and reflectivity, a wide range of viewing angles with good optical characteristics, a range of greyscales or full colour, 45° rotation of light between states and low power consumption. These properties make the present invention particularly useful in optical switches, liquid crystal displays and variable phase gratings. Liquid crystal displays in accordance with the present invention are particularly suitable as electronic paper or displays in portable devices due to the good contrast, wide viewing angle, low power consumption and their ability to use passive addressing and therefore allow the use of significantly more pixels than in current devices.

Figure 4:
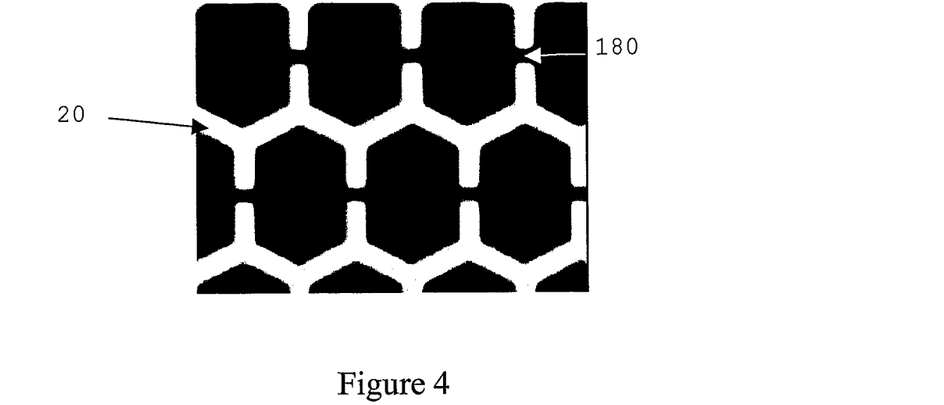
FIG. 4 is a planar view of an alternate liquid crystal device.

Although the above device advantageously isolates the contents of each cavity, in some situations it may be preferable to allow fluid communication between cavities, for example to aid filling of the cavities with liquid crystal material. Thus, in an alternative embodiment as shown in FIG. 4, two or more of the cavities are linked by at least one channel 180. As the size of the channel 180 increases, the elastic preference of the liquid crystal 10 to be oriented and aligned in the direction of the channel 180 increases. If the channel 180 is too wide, then the stability of the stable state in which the liquid crystal 10 aligns perpendicular to the channels 180 is decreased, potentially to the point that this state is no longer stable. In addition, the channel 180 may affect the optics of the device. Therefore, in order to minimise these effects, each channel 180 is advantageously less than 20 µm wide and preferably less than 5 µm wide.

As an alternative embodiment, the above channel alignment effect may be advantageously utilised by sizing and positioning the channels 180 to provide at least one additional stable state. Depending on the orientation of the polariser 50 and position of the channels 180, the additional state may be a "grey" state rather than just light or dark.

Figures 5A, 5B:
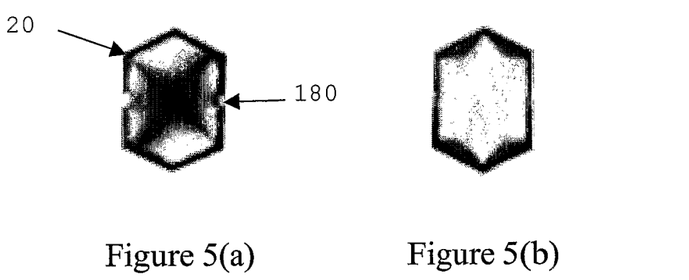
FIG. 5(a) shows a stable state in a cavity of the device of FIG. 4.
FIG. 5(b) shows a differing stable state in a cavity of the device of FIG. 4.

FIGS. 5(a) and 5(b) respectively show two differing stable states in a cavity of the device of FIG. 4. The liquid crystal molecules in the cavity shown in FIG. 5(a) are oriented with the polarisation direction of the polariser 50 whilst the liquid crystal molecules shown in FIG. 5(b) are oriented at 45° to the liquid crystal shown in FIG. 5(a). In this example, the cavity has a horizontal extent of 80 µm and is placed under crossed polarisers. It can be seen that the stable state of FIG. 5(a) is blacker than the stable state of FIG. 5(b).

Figure 6:
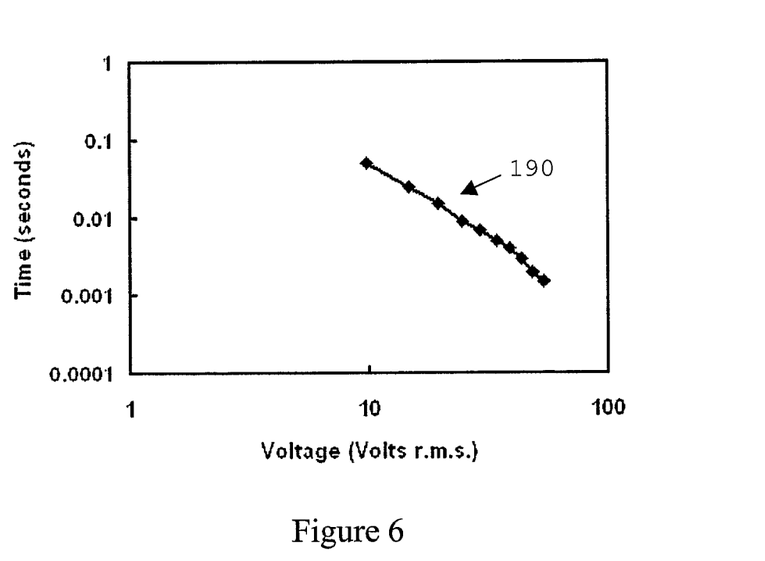
FIG. 6 shows the relationship between the magnitude of the switching voltage and the time the switching voltage is applied for in order to switch the device of FIG. 4 between stable states.

Switching of the above devices depends on the time that the switching field is applied for and the maximum applied voltage. An example of this is shown in FIG. 6, which shows switching by applying a 10 kHz electric field for different lengths of time and with maximum applied voltages. Operation of the device in the region above the line 190 results in switching between stable states, whilst below the line 190, there is no switching. As can be seen, the shorter the time that the switching field is applied for, the higher the maximum applied voltage required to achieve switching and vice-versa.

A skilled person will appreciate that variations of the disclosed arrangements are possible without departing from the invention. For example, in order to minimise diffraction effects, the cavities within the containment structure 20 may be randomly arranged. Alternately, if diffraction effects are required, the cavities can be arranged in orderly fashion, such as an M by N grid, so as to achieve the required diffraction effect, as is known in the art. Furthermore, whilst in the device described with reference to FIGS. 2 to 4, a planar alignment exists on the walls of the cavities and the material of the transparent substrates 30, 35 is selected so that liquid crystal molecules in contact with them tend to align in a direction parallel thereto, it will be appreciated that a homeotropic alignment technique could be used on the cavity.

Accordingly the above description of the specific embodiment is made by way of example only and not for the purposes of limitation. It will be clear to the skilled person that minor modifications may be made without significant changes to the operation described.

The invention claimed is:

1. A reflective multi stable liquid crystal device having liquid crystal molecules between two substrates in two or more cavities having a polygon shape in cross-section, the liquid crystal molecules being in direct contact with each cavity, wherein at least one liquid crystal region of high distortion is formed at a corner in each cavity, the distortion region(s) having at least two stable states, the device having an entrance polarizer, and the device configured with electrodes arranged to apply an electric field having a component substantially parallel to the substrates whereby the distortion region is switchable between the at least two stable states with an oblique angle of rotation in the plane of the liquid crystal molecules between the direction of liquid crystal molecules in a majority of the liquid crystal of each of the at least two stable states, and wherein at least two of said cavities are linked by at least one channel.

2. The multistable liquid crystal device as claimed in claim 1 wherein the liquid crystal molecules and the cavities are between a transparent substrate and a reflective substrate, whereby the oblique angle of rotation is accumulative to reflection by the reflective substrate.

3. The multistable liquid crystal device according to claim 1 wherein the majority of liquid crystal molecules in at least one stable state are aligned at an oblique angle to the direction of the majority of liquid crystal molecules in at least one other stable state.

4. The multistable liquid crystal device according to claim 3 wherein the majority of liquid crystal molecules in at least one stable state are aligned at substantially 45° to the direction of the majority of liquid crystal device molecules in at least one other stable state.

5. The multistable liquid crystal device according to claim 1 wherein the two or more cavities have a hexagonal cross section.

6. The multistable liquid crystal device according to claim 1 wherein there is a sharp transition between certain adjoining cavity walls.

7. The multistable liquid crystal device according to claim 1 wherein the walls that define the cavities are substantially perpendicular to a base or substrate.

8. The multistable liquid crystal device according to claim 1 wherein the liquid crystal molecules in the stable states lie in a plane substantially parallel to a base of the cavity.

9. The multistable liquid crystal device according to claim 1 wherein the liquid crystal in each cavity is isolated from the liquid crystal in adjoining cavities.

10. The multistable liquid crystal device according to claim 1 wherein the liquid crystal device is a nematic liquid crystal device.

11. The multistable liquid crystal device according to claim 1 wherein electrodes are located on the cavity walls.

12. The multistable liquid crystal device according to claim 1 where the containment structure is formed from a photoresist or polymeric material.

13. The multistable liquid crystal device according to claim 1 where at least one electrode is associated with one or more cavities, and attached to a switching device.

14. The multistable liquid crystal device according to claim 13, wherein the switching device contains one or more thin film transistors.

15. The multistable liquid crystal device according to claim 1, wherein the channel(s) are less than 20 μm wide and preferably less than 5 μm wide.

16. The multistable liquid crystal device according to claim 1, wherein the channel(s) are less than 5 μm wide.

17. An optical switch or a changeable phase grating or a phase device for telecommunications or a display device that includes the multistable liquid crystal device according to claim 1.

18. A method of switching states in the liquid crystal device containing liquid crystal molecules within a cavity in a containment structure as claimed in claim 1.

* * * * *